(12) United States Patent
Davani et al.

(10) Patent No.: US 7,369,119 B2
(45) Date of Patent: May 6, 2008

(54) HANDSET DEVICE WITH DUAL SIDE JOYSTICK

(75) Inventors: Shouresh T. Davani, Boynton Beach, FL (US); Daniel A. Baudino, Lake Worth, FL (US); Rene R. Zada, Wellington, FL (US)

(73) Assignee: Motorola, Inc., Schaumburg, IL (US)

( * ) Notice: Subject to any disclaimer, the term of this patent is extended or adjusted under 35 U.S.C. 154(b) by 709 days.

(21) Appl. No.: 10/875,353

(22) Filed: Jun. 24, 2004

(65) Prior Publication Data
US 2006/0007143 A1    Jan. 12, 2006

(51) Int. Cl.
G09G 5/08    (2006.01)
(52) U.S. Cl. ............... 345/161; 345/169; 345/156
(58) Field of Classification Search ........... 345/161, 345/169, 156
See application file for complete search history.

(56) References Cited

U.S. PATENT DOCUMENTS 6,587,094 B2 * 7/2003 Anderson ............ 345/168
6,681,124 B2   1/2004 Prior et al.
7,016,182 B2 * 3/2006 Brandenberg et al. ...... 361/683

* cited by examiner

Primary Examiner—Richard Hjerpe
Assistant Examiner—Leonid Shapiro

(57) ABSTRACT

An electronic device (100, 200) contains a first joystick mechanism (114) and a second joystick mechanism (112), each joystick mechanism (112, 114) extending outside of substantially opposed outer surfaces (403, 414) of the electronic device's casing. When a directional mechanical force is applied to one joystick mechanism (112, 114), at least one of a plurality of switches (410) may be engaged. The joystick mechanisms (112, 114) are electrically coupled, and each mechanism will provide the same functionality. The joystick mechanisms (112, 114) may be further mechanically coupled, whereby applying a directional mechanical force on one joystick mechanism will move the other joystick mechanism in the opposite direction. Additionally, the joystick mechanisms (112, 114 or 1002, 1004) may contain a sensor (416) capacitvely coupled to a conductive end cap (404, 405) to detect from which side of the electronic device (100, 200) a joystick mechanism is being moved.

15 Claims, 9 Drawing Sheets

HANDSET DEVICE WITH DUAL SIDE JOYSTICK

FIELD OF THE INVENTION

The present invention generally relates to the field of portable wireless devices and more particularly to a wireless device having a plurality of joysticks.

BACKGROUND OF THE INVENTION

A large number of personal electronics devices, such as cellular telephones, two-way radios, personal data assistants (PDAs), hand-held gaming devices and portable computers have long used a joystick as a means of entering information from the user. As these devices have become increasingly smaller, it has become more difficult to provide an input mechanism that is sufficiently large enough for a human hand to operate comfortably, while also locating this mechanism in a position to enable optimal interaction with the device. For instance, in some specific form factors, when the user attempts to interact by way of the joystick, the user's hand actually interferes with the use of the unit's display module. Additionally, form factors of cellular phones that incorporate a "flip" feature can prevent the user from accessing the joystick while the "flip" is closed. Certain software features of the device, such as overall game experience, are limited by using only the front side of the device for joystick location.

In the past, the most desirable feature for a wireless phone was simply the ability to transfer information from one location to another. But today, the complexity of these devices has enabled them to become more than a means for communicating to remote locations; they have become an integral part of society. As such, many people rely on these devices for much more than merely talking. The phones of today are capable of providing computing functions, searching the internet, playing an ever-increasing variety of games, and storing a person's entire personal and/or business contacts for instant access.

As the telecommunication industry continues to decrease the size of these devices while increasing their overall utility, the need to enhance user interaction while providing uninterrupted feedback and unobstructed viewing becomes more pronounced. Therefore a need exists to overcome the problems with the prior art as discussed above.

SUMMARY OF THE INVENTION

Briefly, in accordance with the embodiments of the present invention, disclosed are a method for operating an electronic device and the electronic device containing a first joystick mechanism and a second joystick mechanism, each joystick mechanism extending outside of substantially opposed outer surfaces of the electronic device's casing. When a moveable directional force is applied to one joystick mechanism, at least one of a plurality of switches may be engaged.

The joystick mechanisms are electrically coupled to a controller, and each joystick mechanism will provide the same functionality. However, this functionality will physically mirror the functionality of the other joystick.

The pair of joystick mechanisms may be further mechanically coupled, whereby applying a directional mechanical force in one direction on one joystick mechanism will move the other joystick mechanism in the opposite direction.

Additionally, the pair of joystick mechanisms may contain a pair of sensors, each sensor capacitively coupled to a conductive end cap of one joystick mechanism and to a frequency detection circuit, to detect from which side of the electronic device a joystick mechanism is being moved. When a user touches a capacitive end cap, the output frequency of the corresponding oscillator shifts, identifying the joystick mechanism that has been touched.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
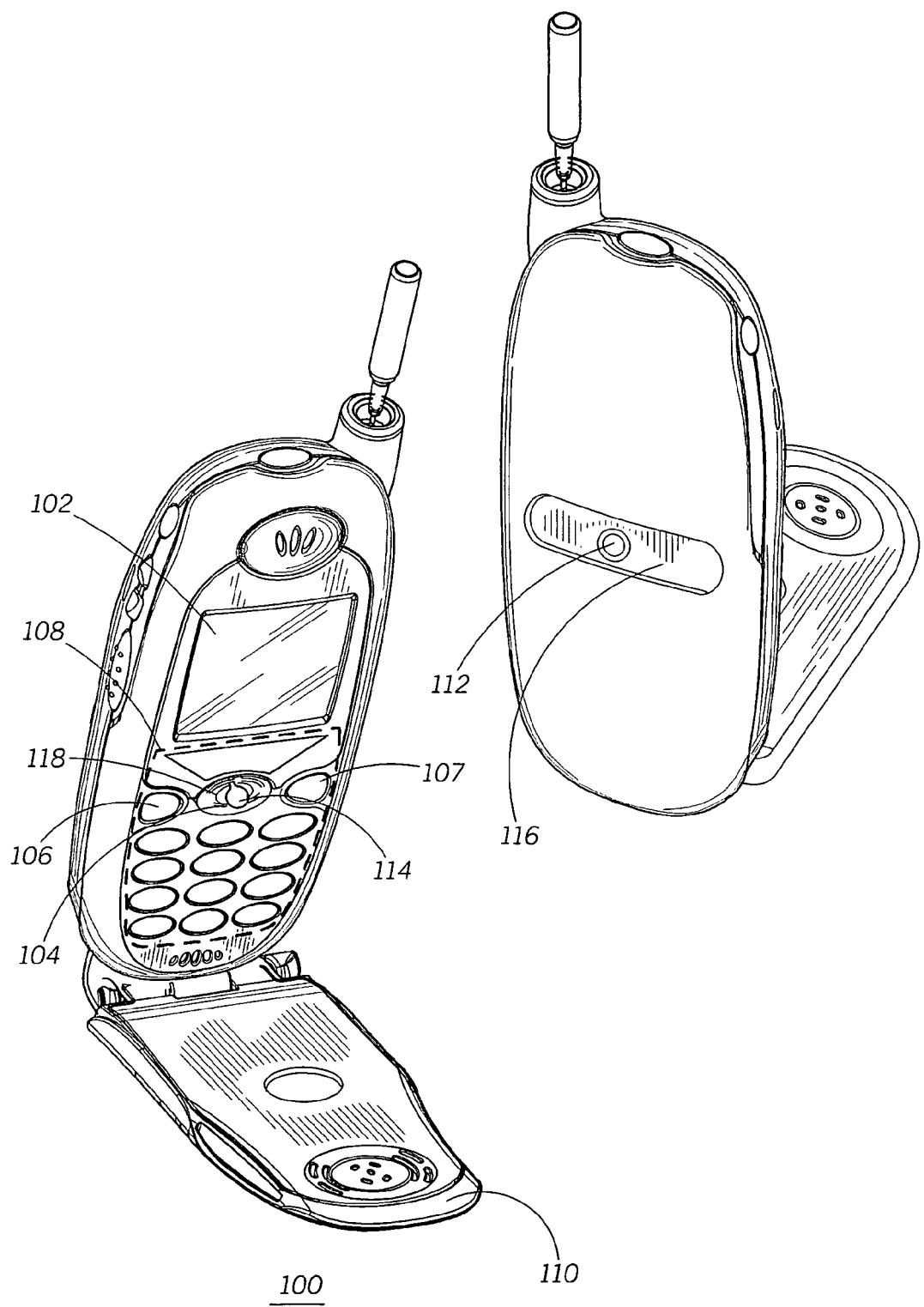
FIG. 1 is an illustration containing a front view and a rear view of an exemplary electronic device that incorporates a dual side joystick, according to an embodiment of the present invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

While the specification concludes with claims defining the features of the invention that are regarded as novel, it is believed that the invention will be better understood from a consideration of the following description in conjunction with the drawing figures, in which like reference numerals are carried forward.

FIG. 1 illustrates a front view and a rear view of an exemplary electronic device 100. The exemplary electronic device 100 comprises any device 100 with a display screen 102 including, for example, a wireless telephone, radio, PDA, computer, electronic organizer, pager, or other messaging device, an electronic game machine, and an electronic timepiece. An exemplary electronic device 100 includes a dual-side joystick 104, having a front side joystick mechanism 114 and a rear side joystick mechanism 112, which provides the user with access to the joystick 104 from either the front side or the rear side of the wireless device 100. Please note that the terms "electronic device", "phone", "cell phone", "radio", and "wireless device", may be used interchangeably throughout this document in reference to an exemplary electronic device. The wireless device 100 may also include a keypad 108 and other physical buttons 106, 107 that are part of a user input interface. The keypad 108 may be protected from accidental button presses by the use of a "flip" feature 110 (hereinafter a "flip"). The user may open or close the flip 110 depending upon the desired use. Because the size of the phone 100 varies, on particularly small units, some flips 110 may also include an audio transducer to provide closer access to the user's mouth. It should be noted here that in some instances, when the flip 110 is in the closed position, access to the front side 114 of the dual-side joystick 104 may be prevented. The closed flip 110 may prevent accidental activation of the front side joystick mechanism 114 when the flip 110 is designed to cover the joystick 104.

Additionally, a recessed area 118 around the front side joystick mechanism 114 may also help to prevent accidental activation when the phone is laid face down. A recessed area 116 around the rear side joystick mechanism 112 may not only prevent accidental activation, but also provides an ergonomically pleasing fit for the user's finger while operating the rear side joystick mechanism 112. Support "feet" (not shown) located on the rear side of the electronic device 100 may also protect the rear side joystick mechanism 112 from unintentional engagement when the electronic device 100 is resting on its back.

Figure 2:
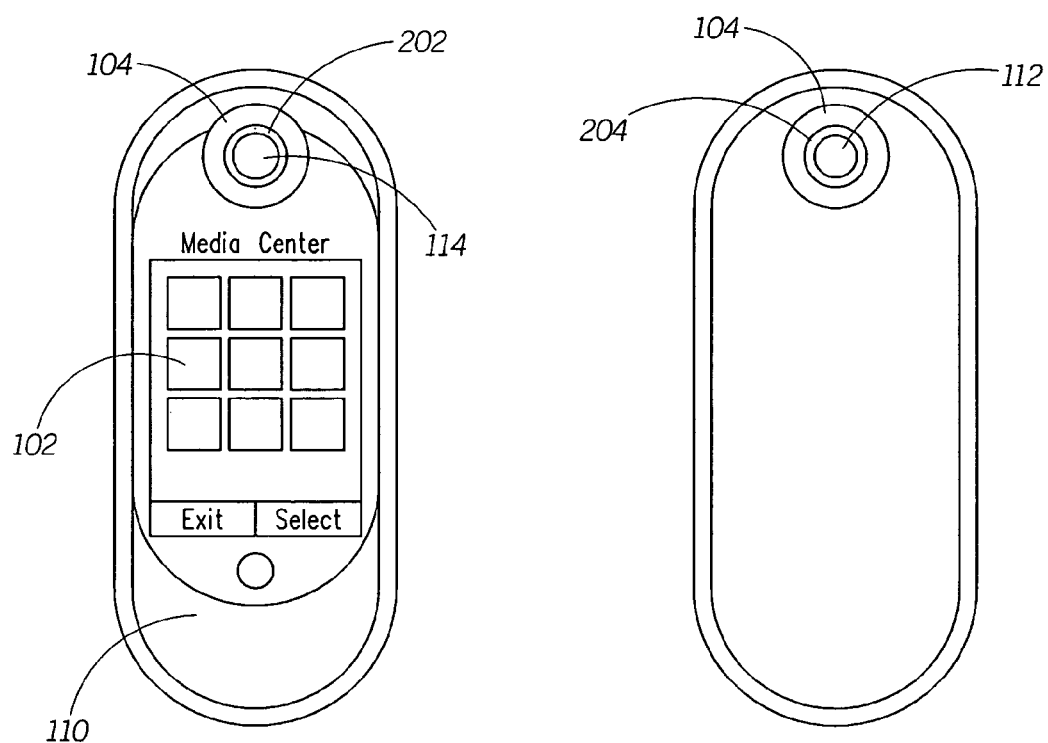
FIG. 2 is an illustration containing a front view and a rear view of an exemplary electronic device that incorporates a dual side joystick, according to another embodiment of the present invention.

FIG. 2 illustrates a front view and a rear view of an alternative electronic device design 200. In this embodiment, the dual-side joystick 110 is located at the top of the device 200, above the display screen 102. Notice in this embodiment, when the flip 110 is in the closed position, a user may still access the front side 114 of the joystick 104, however, since the joystick 104 is above the display screen 102, the user's hand will typically obstruct the viewing area of the display screen 102. By using the rear side 112 of the joystick 104, the user may still interact with the electronic device 200 without obscuring the display screen 102. Again, as in the prior embodiment, a recessed area 202 around the front side joystick mechanism 114 helps prevent accidental activation. Another recessed area 204 around the rear side joystick mechanism 112 serves the same function.

Figure 3:
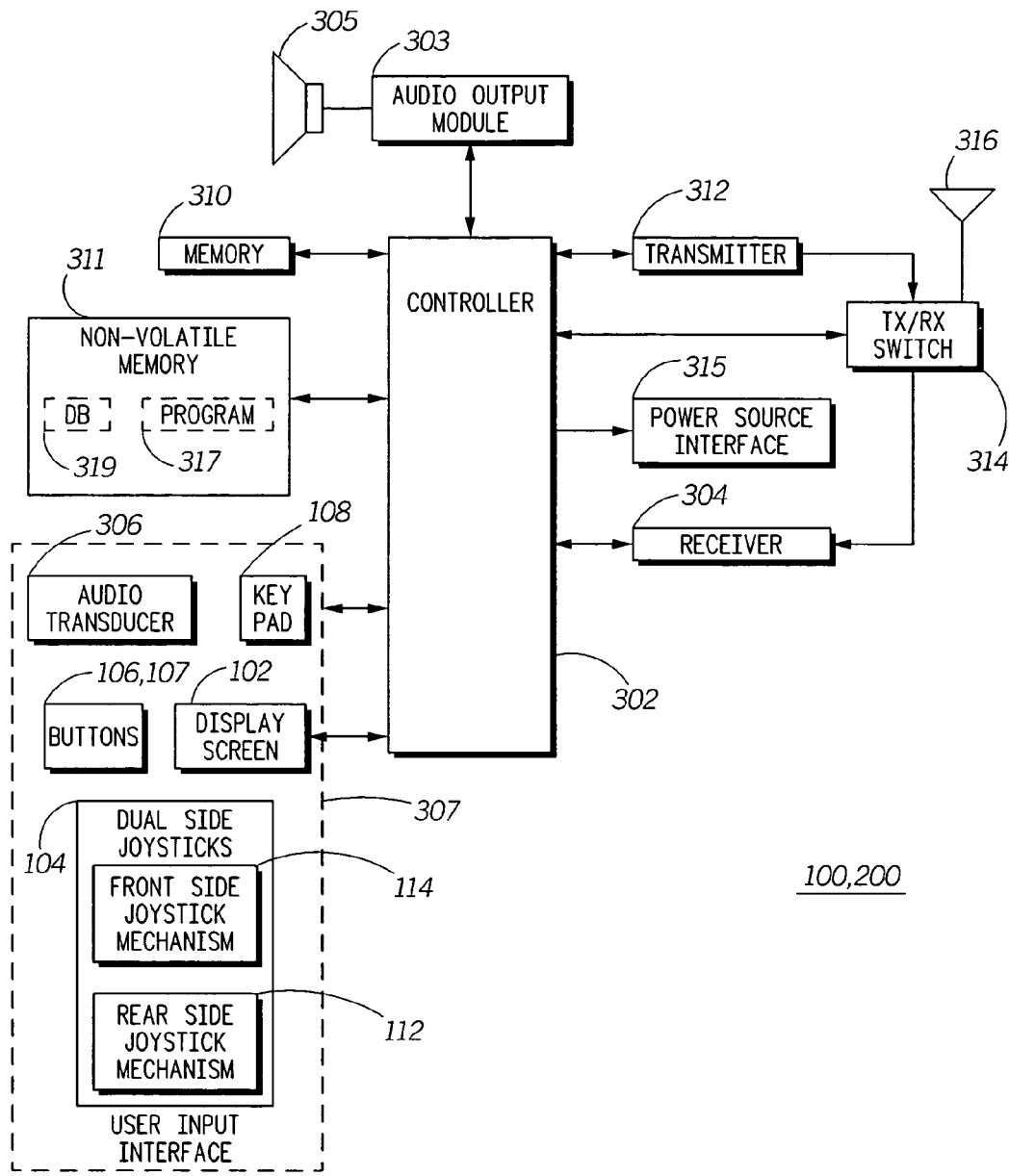
FIG. 3 is an electrical block diagram of the electronic devices of FIGS. 1 and 2, according to an embodiment of the present invention.

Referring now to FIGS. 1 to 3, it can be seen that the exemplary electronic devices 100, 200 include a controller 302, communicatively coupled with a user input interface 307. The user input interface 307 includes, in this example, a dual-side joystick 104 having a front side joystick mechanism 112 and a rear side joystick mechanism 114, physical buttons 106, 107, that are part of a keypad 108, and an audio transducer 306 such as in a microphone (not shown) to receive and convert audio signals to electronic audio signals for processing in the electronic device 100, 200, in a manner well known to those of ordinary skill in the art. The electronic device 100, 200, according to the present example, also comprises a memory 310, a non-volatile (program) memory 311 containing at least one application program 317 and a database 319, and a power source interface 315.

The electronic device 100, 200, according to an embodiment, comprises a wireless communication device 100, 200, such as a cellular phone, a portable radio, a PDA equipped with a wireless modem, or other such type of wireless device. The wireless communication device 100, 200, transmits and receives signals for enabling a wireless communication such as for a cellular telephone, in a manner well known to those of ordinary skill in the art. For example, when the wireless communication device 100, 200, is in a "receive" mode, the controller 302 controls a radio frequency (RF) transmit/receive switch 314 that couples an RF signal from an antenna 316 through the RF transmit/receive (TX/RX) switch 314 to an RF receiver 304, in a manner well known to those of ordinary skill in the art. The RF receiver 304 receives, converts, and demodulates the RF signal, and then provides a baseband signal to an audio output module 303 and a transducer 305, such as a speaker, to output received audio from the speaker 305. In this way, for example, received audio can be provided to a user of the wireless device 100, 200. A receive operational sequence is normally under control of the controller 302 operating in accordance with computer instructions stored in the program memory 311, in a manner well known to those of ordinary skill in the art.

In a "transmit" mode, the controller 302, for example responding to a detection of a user input (such as a user pressing a button or switch on the keypad 108), controls the audio circuits and couples electronic audio signals from the audio transducer 306 of a microphone interface to transmitter circuits 312. The controller 302 also controls the transmitter circuits 312 and the RF transmit/receive switch 314 to turn ON the transmitter function of the electronic device 100, 200. The electronic audio signals are thereby modulated onto an RF signal and coupled to the antenna 316 through the RF TX/RX switch 314 to transmit a modulated RF signal into a wireless communication system (not shown). This transmit operation enables the user of the device 100, 200 to transmit, for example, audio communication into the wireless communication system in a manner well known to those of ordinary skill in the art. The controller 302 operates the RF transmitter 312, RF receiver 304, the RF TX/RX switch 314, and the associated audio circuits (not shown), according to computer instructions stored in the program memory 311.

The controller 302 is communicatively coupled to the user input interface 307 for receiving user input from a user of the electronic device 100, 200. It is important to note that the user input interface 307, in one exemplary embodiment, may comprise a display screen 102 with touch-screen features or "soft buttons" as also known in the art. The controller 302 is also communicatively coupled to the display screen 102 (such as a display screen of a liquid crystal display module) for displaying information to the user of the device 100. The display screen 102 may therefore serve both as a user input device (to receive user input from a user) and as a user output device to display information to the user. The user input interface 307 couples data signals to the controller 302 based on the keys 108 or buttons 106, 107 pressed by the user, and/or the movement of the front joystick mechanism 114 or rear joystick mechanism 112. The controller 302 is responsive to the user input data signals thereby causing functions and features under control of the controller 302 to operate in the device 100, 200. The structure and function associated with the dual-side joystick 104 will be discussed in more detail below.

Figure 4:
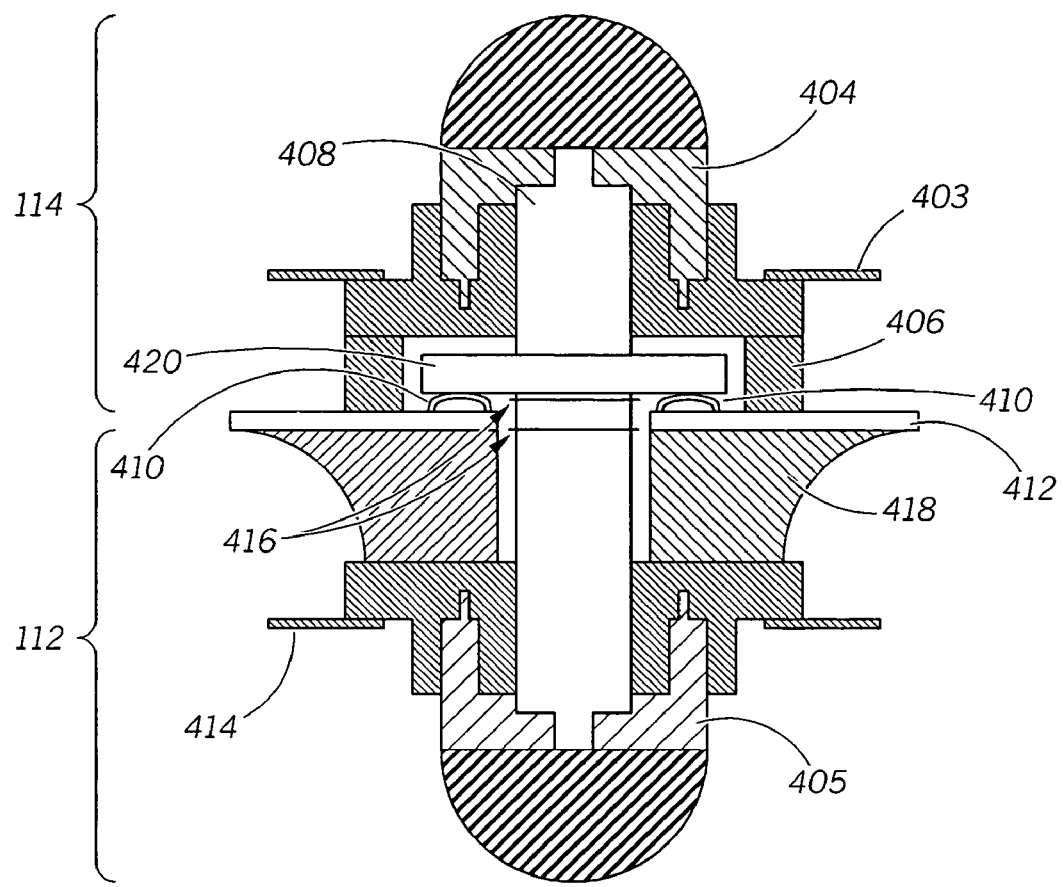
FIG. 4 is an assembly drawing of a cross-sectional area of a dual-side joystick, shown mounted within an electronic device such as that shown in FIGS. 1 and 2, according to an embodiment of the present invention.
Figure 5:
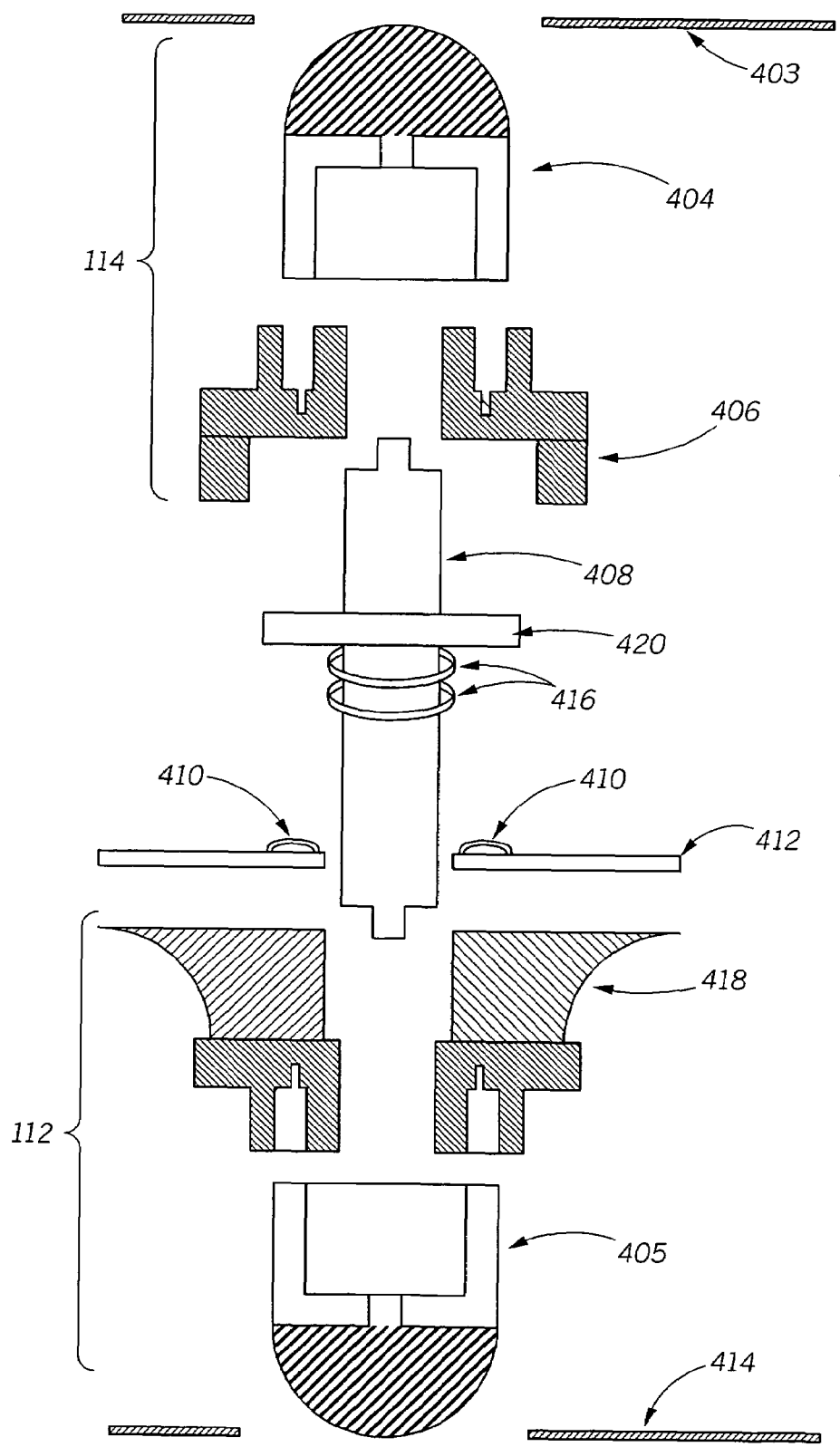
FIG. 5 is an exploded view of the dual-side joystick assembly of FIG. 4, according to an embodiment of the present invention.

The present invention, according to an embodiment of an electronic device 100, 200, as shown in FIGS. 1 and 2, advantageously overcomes problems with the prior art by providing a joystick 104 that is accessible from either the front side (via the front side joystick mechanism 114) or rear the side (via the rear side joystick mechanism 112) of the electronic device 100, 200. FIGS. 4 and 5 illustrate an assembly view and an exploded view, respectively, of an embodiment of a dual-side joystick 104. The dual-side joystick 104 allows a pair of joystick mechanisms 112, 114, protruding through opposite sides of the electronic device 100, 200, to function as a single joystick 104. Both of the joystick mechanisms 112,114 are electrically coupled to the controller 302.

One embodiment of the dual-side joystick assembly 104 consists of a front joystick mechanism 114 and a rear joystick mechanism 112, mechanically coupled by way of a common shaft 408 which extends through both sides of substantially opposed outer surfaces (i.e. front 402 and rear 414 casings or housings) of the electronic device 100, 200. Each joystick mechanism 112, 114, contains an end cap 404, 405, and is supported between each end cap 404, 405, and a printed circuit board (PCB) 412 by a rubber grommet 406, 418 on each side of the PCB 412. The shaft 408 extends from the front end cap 404, through a hole 906 (see FIG. 9) in the PCB 412, to the rear end cap 405. A user applies a directional force upon an end cap 404, 405 to move and activate the joystick 104. The shaft 408 connecting the joystick mechanisms 112, 114 includes a collar 420 which is located slightly above a circuit supporting substrate, such as a PCB 412, when the electronic device 100, 200, is assembled. The collar 420 is large enough in diameter to engage switches 410 (such as popple switches) mounted in a pattern around the center hole 906 (see FIG. 9) on the PCB 412, through which the shaft 408 extends. The shaft is also encircled by a capacitive sensor 416 for determining from which side of the electronic device 100, 200, the user is activating the joystick 104. This aspect will be discussed in more detail later. The front rubber grommet 406 has a cut-out large enough so that the collar 420 may move freely.

Figure 6:
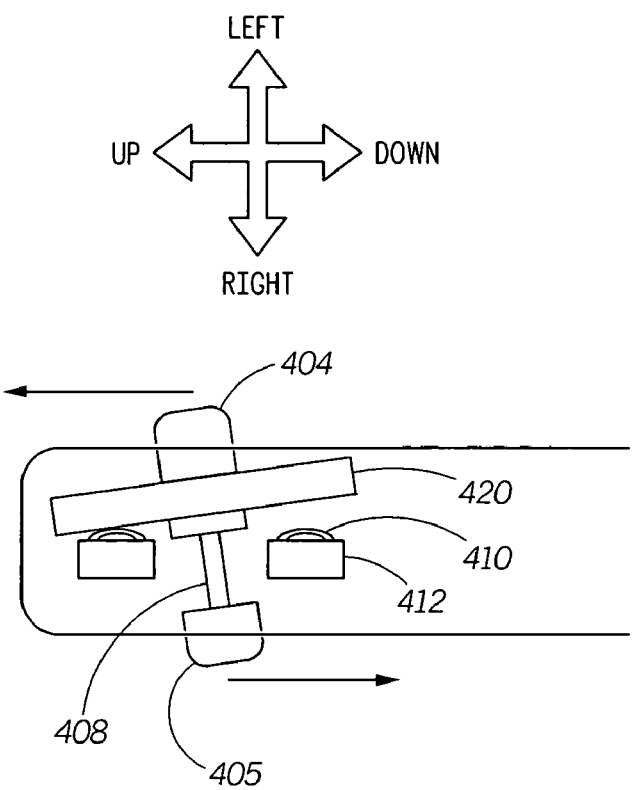
FIG. 6 is an operational diagram illustrating the exemplary dual-side joystick of FIG. 4 in operation within an electronic device such as shown in FIGS. 1 and 2, according to an embodiment of the present invention.
Figure 7:
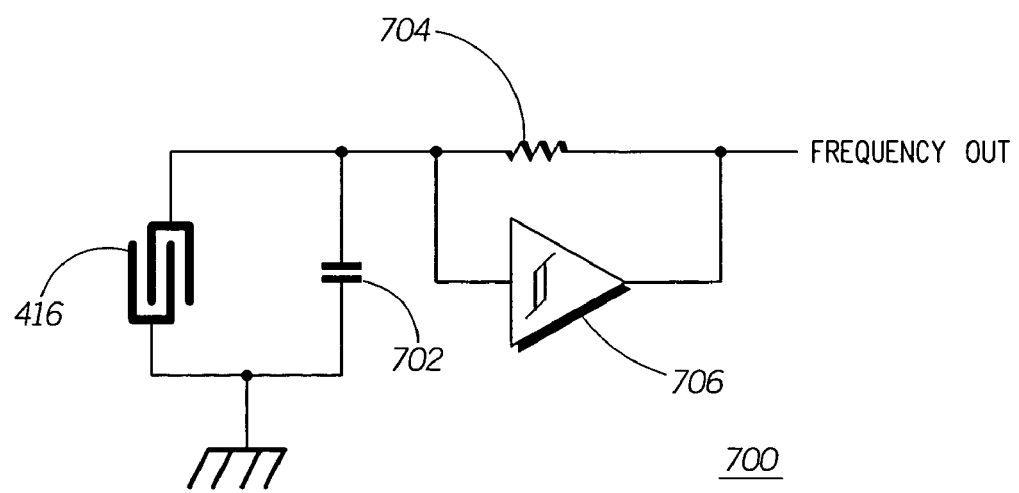
FIG. 7 is an electronic circuit block diagram illustrating an exemplary electrical interface between the dual-side joystick of FIG. 4 and an electronic device as shown in FIGS. 1 and 2, according to an embodiment of the present invention.

As shown in FIG. 6, when a user applies a movable directional force upon an end cap 404, 405 the shaft 408 will pivot, causing the collar 420 to engage and activate at least one switch 410. Notice, if the user moves and is activating the front joystick mechanism 114 the switch 410 activated by the collar 420 will correspond, in its physical location, to the direction in which the user is pressing (i.e. when the user presses the joystick up, the "up" direction is selected). However, if the user is activating the rear joystick mechanism 112, the switch 410 activated will actually indicate the opposite of the direction in which the user is pressing the joystick 104. (i.e. when the user presses the joystick up, the "down" direction is selected, as well as when the user presses the joystick right, the "left" direction is selected). In order to compensate for this discrepancy, it is necessary to be able to determine from which side of the electronic device 100, 200 the user is operating the joystick 104. This may be accomplished by a pair of electronic sensing circuits 700 such as that shown in FIG. 7. The capacitive sensor 416 around the common shaft 408 is electrically coupled to the conductive front end cap 404 on the front joystick mechanism 114. A separate second capacitive sensor 416' is electrically coupled to the other conductive end cap 405 on the rear joystick mechanism 112. The frequency of operation is set using the capacitance of the sensor 416, C 702, and R 704 by means which would be obvious to those skilled in the art. The capacitance of the sensor 416 varies when the user places a finger on a conductive end cap 404, 405. The oscillator 700 will output a frequency which can be measured using techniques well-known to those skilled in the art. The value of the output frequency indicates whether the user is touching that particular conductive end cap 404, 405. If the system detects that the joystick 104 is used from both sides, then the front side is the default side.

Figure 8:
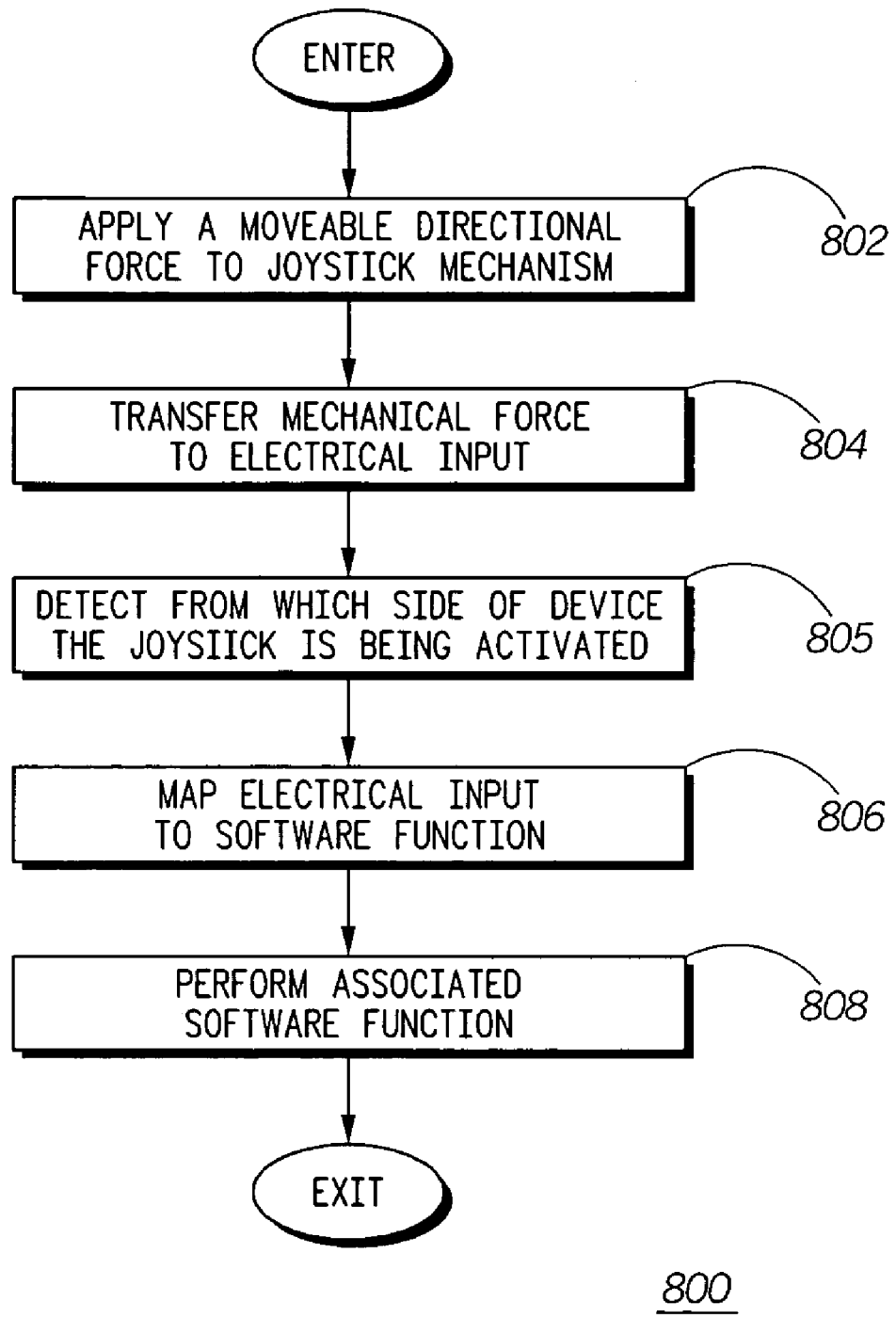
FIG. 8 is an operational flow diagram illustrating an exemplary operational sequence for an electronic device such as shown in FIGS. 1 and 2, according to an embodiment of the present invention.

An exemplary flow diagram for operating the dual-side joystick 104 is shown in FIG. 8. A directional mechanical force is applied to a joystick mechanism 112, 114 at step 802. This mechanical force is transferred to an electrical input through a switch 410, at step 804. Next, at step 805, the electronic device 100, 200 detects from which side of the device the user is activating the dual-side joystick 104. At step 806, the electrical input is mapped to an appropriate corresponding software function and the associated software function is performed, at step 808.

Note that step 805 may be optional in software. Although it may be desirable for some users to have the movement of the rear joystick mechanism 402 mapped to coordinate with the directional force applied, since people think differently, some may prefer to keep the inverted logic.

Figure 9:
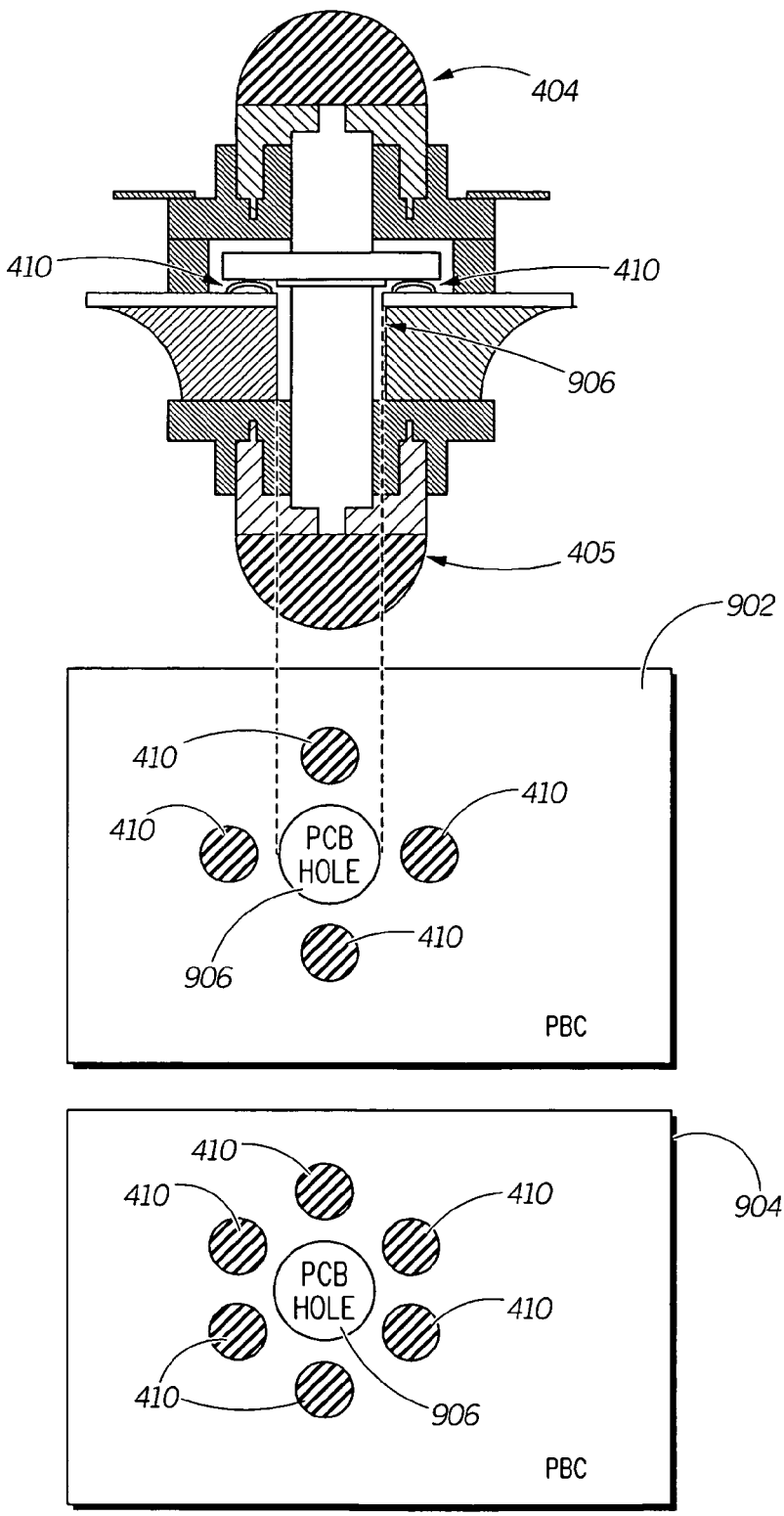
FIG. 9 illustrates exemplary switch configurations for a dual-side joystick in accordance with an embodiment of the present invention.

FIG. 9 illustrates patterns for arranging tactile switches 410 on the PCB 412. In arrangement 902, the switches 410 may be mounted at 90° intervals around a center hole 906 in the PCB 412. The alternative arrangement 904 uses six actual switches 410, arranged to allow more precision.

Figure 10:
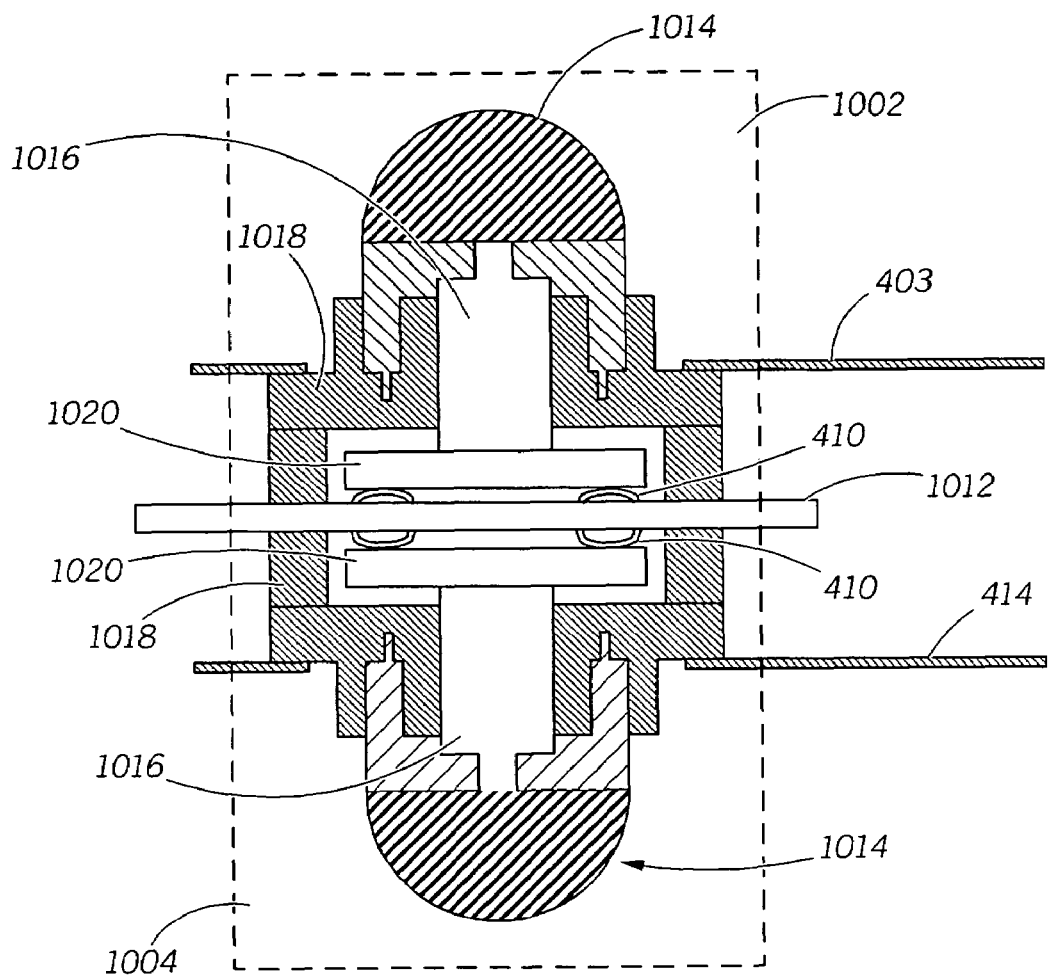
FIG. 10 is an assembly drawing of a cross-sectional area of an alternative dual-side joystick, featuring two mechanically independent joystick mechanisms mounted on opposite sides of a printed circuit board, shown assembled within an electronic device such as that shown in FIGS. 1 and 2, according to an embodiment of the present invention.

FIG. 10 illustrates an alternative embodiment of the present invention using two separate joystick mechanisms 1002, 1004. Each joystick mechanism 1002, 1004 mechanically operates independently of the other joystick mechanism, and contains a shaft 1016 with a collar 1020 on one end and an end cap 1014 on the opposite end. It is clear that both joystick mechanisms 1002, 1004, are electrically coupled to the controller 302. The collar 1020 is large enough in diameter to engage a pattern of switches 410 mounted on one side of the PCB 1012. Each joystick mechanism 1002, 1004, is encapsulated by a rubber grommet 1018, mounted between an outer casing 403, 414, of the device 100, 200, and the PCB 1012. One mechanism 1002 is sandwiched between the front casing 403 and the PCB 912, while the other mechanism 1004 is between the rear casing 414 and the PCB 912. Because each mechanism 1002, 1004, acts independently, there is no need in this configuration to determine from which side of the device 100, 200, the user is activating the joystick. Each switch 410 may be mapped to an independent function, or the function of each switch 410 may be electrically duplicated by the switches 410 located on the opposite side of the PCB 1012.

The use of a dual-side joystick is a significant advantage of the present invention over the prior art. It provides a new and novel utility and natural ease of use of the device 100, 200 to a user. The user is able to activate the dual-side joystick 104 from whichever position feels most comfortable to the user, without obstructing other features, such as the viewing of a display screen. This dual-side joystick feature will be especially desirable by users of electronic devices 100, 200, that are becoming smaller and smaller, such as cellular phones. To meet consumer demands for portability and miniaturization, and consequently, it has been necessary for such devices 100, 200, to locate a single-sided joystick in unusual, unnatural, or awkward locations. Due to its desirability by consumers, this feature will significantly enhance the commercial viability of any such electronic device 100, 200.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments.

Furthermore, it is intended that the appended claims cover any and all such applications, modifications, and embodiments within the scope of the present invention.

What is claimed is:

1. An electronic device comprising:
   a casing having a first and second outer surfaces that are substantially opposing each other;
   a circuit supporting substrate;
   a first joystick mechanism and a second joystick mechanism; the first joystick mechanism extending outside of the first outer surface and the second joystick mechanism extending outside of the second outer surface;
   a controller; and
   a plurality of switches disposed on the circuit supporting substrate and being electrically coupled with the controller, a movement of the first joystick mechanism activating at least one of the plurality of switches to indicate a first movement direction to the controller and a movement of the second joystick mechanism activating at least one of the plurality of switches to indicate the first movement direction to the controller, the first and second joystick mechanisms being interchangeable for indicating a movement direction to the controller.

2. The electronic device of claim 1, wherein the joystick mechanisms are coupled to each other by a mechanical means whereby applying a movable directional force to one joystick mechanism moves the other joystick mechanism in an opposite direction.

3. The electronic device of claim 2, wherein the first and second joystick mechanisms each comprise an electrically conductive end cap.

4. The electronic device of claim 3, further comprising:
   at least two sensors, one sensor electrically coupled to each joystick mechanism end cap;
   at least two oscillators, each oscillator capacitively coupled to one of the at least two sensors; and
   at least two frequency detection circuits, each circuit electrically coupled to one of the at least two oscillators and to the controller, for detecting from which outer surface the movable directional force is being applied.

5. The electronic device of claim 1, wherein the electronic device comprises at least one of a cellular phone, radio, personal data assistant, computer, electronic organizer, pager, hand-held gaming device, and an electronic timepiece.

6. A wireless electronic device comprising:
   a receiver;
   a transmitter;
   a casing having a first and second outer surfaces that are substantially opposing each other;
   a circuit supporting substrate;
   a controller, communicatively coupled to the receiver and the transmitter, for controlling the operation of the receiver and transmitter and providing data to and from a user; and
   a user interface, communicatively coupled to the controller, for receiving instructions from and supplying feedback to a user, the user interface comprising:
   a first joystick mechanism and a second joystick mechanism; the first joystick mechanism extending outside of the first outer surface and the second joystick mechanism extending outside of the second outer surface; and
   a plurality of switches disposed on the circuit supporting substrate and being electrically coupled with the controller, a movement of the first joystick mechanism activating at least one of the plurality of switches to indicate a first movement direction to the controller and a movement of the second joystick mechanism activating at least one of the plurality of switches to indicate the first movement direction to the controller, the first and second joystick mechanisms being interchangeable for indicating a movement direction to the controller.

7. The wireless device of claim 6, wherein the joystick mechanisms are coupled to each other by a mechanical means whereby applying a movable directional force to one joystick mechanism moves the other joystick mechanism in an opposite direction.

8. The wireless device of claim 7, wherein the first and second joystick mechanisms each comprise an electrically conductive end cap.

9. The wireless device of claim 8, further comprising:
   at least two sensors, one sensor electrically coupled to each joystick mechanism end cap;
   at least two oscillators, each oscillator capacitively coupled to one of the at least two sensors; and
   at least two frequency detection circuits, each circuit electrically coupled to one of the at least two oscillators and to the controller, for detecting from which outer surface the movable directional force is being applied.

10. A method of operating an electronic device having a casing that includes substantially opposing outer surfaces, one of which includes a display, comprising:
    applying a directional mechanical force to a joystick mechanism within a pair of joystick mechanisms, the pair of joystick mechanisms mounted in a manner allowing at least one mechanism to protrude through each of the substantially opposing outer surfaces of the electronic device casing, wherein applying the directional mechanical force includes applying the force to the mechanism that protrudes through the outer surface that does not contain the display, thereby preventing a user's hand from obscuring the display; and
    transferring the directional mechanical force to an electrical input.

11. The method of claim 10, further comprising:
    mapping the electrical input to a software function; and
    performing the mapped software function.

12. The method of claim 10, further comprising:
determining from which substantially opposed outer surface the directional mechanical force is being applied;
mapping the electrical input to a software function according to which outer surface the force is being applied; and
performing the mapped software function.

13. The method of claim 12, wherein the determining from which substantially opposed outer surface the mechanical force is being applied comprises:
measuring an output frequency of each of a pair of oscillators, each frequency being determined by a capacitive sensor coupled to a conductive end cap of one joystick mechanism, the capacitance of the sensor varying when the end cap is touched; and
comparing each output frequency to a predetermined value.

14. A computer readable medium comprising computer instructions for:
receiving an electrical input resulting from applying a directional mechanical force to a joystick mechanism within a pair of joystick mechanisms, the pair of joystick mechanisms mounted in a manner allowing at least one mechanism to protrude through each of substantially opposing outer surfaces of an electronic device casing;
determining from which substantially opposed outer surface the directional mechanical force is being applied;
mapping the electrical input to a software function according to which outer surface the force is being applied; and
performing the mapped software function, wherein the determining from which substantially opposed outer surface the mechanical force is being applied comprises instructions for:
measuring an output frequency of each of a pair of oscillators, each frequency being determined by a capacitive sensor coupled to a conductive end cap of one joystick mechanism, the capacitance of the sensor varying when the end cap is touched; and
comparing each output frequency to a predetermined value.

15. The computer readable medium of claim 14, further comprising instructions for:
mapping the electrical input to a software function; and
performing the mapped software function.

* * * * *